United States Patent
Gordon et al.

(10) Patent No.: US 7,259,126 B2
(45) Date of Patent: Aug. 21, 2007

(54) GAS DIFFUSION ELECTRODE AND CATALYST FOR ELECTROCHEMICAL OXYGEN REDUCTION AND METHOD OF DISPERSING THE CATALYST

(75) Inventors: John H. Gordon, Salt Lake City, UT (US); Hachiya Toshinori, Nobeoka (JP); Shekar H. Balagopal, Sandy, UT (US); Sai V. Bhavaraju, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 459 days.

(21) Appl. No.: 10/708,565

(22) Filed: Mar. 11, 2004

(65) Prior Publication Data
US 2005/0201918 A1 Sep. 15, 2005

(51) Int. Cl.
*B01J 23/00* (2006.01)
*B01J 23/10* (2006.01)

(52) U.S. Cl. ...................... 502/302; 502/525
(58) Field of Classification Search ............... 502/302, 502/525
See application file for complete search history.

(56) References Cited

U.S. PATENT DOCUMENTS 3,922,204 A * 11/1975 Tseung et al. ............ 205/786
6,060,420 A * 5/2000 Munakata et al. ......... 502/302
6,129,862 A 10/2000 Munakata et al.
6,428,722 B1 8/2002 Furuya
6,946,213 B2 * 9/2005 Seabaugh et al. ............ 429/40

OTHER PUBLICATIONS

Furuya et al., entitled Comparative study of oxygen cathodes loaded with Ag and Pt catalysts in chlor-alkali membrane cells, Electrochimica Acta, vol. 45, pp. 4251-4256 (2000).
N. Miura et al., entitled Kinetics of Cathodic Oxygen Reduction on Lanthanum-based Perovskite-type Oxides, Nippon Kagaku Kaishi, vol. 4, pp. 644-649 (1985).

(Continued)

*Primary Examiner*—J. A. Lorengo
*Assistant Examiner*—Patricia L. Hailey
(74) *Attorney, Agent, or Firm*—David Fonda

(57) ABSTRACT

An improved gas diffusion electrode composed of a perovskite-type oxide dispersed in a mixture of carbon black and a hydrophobic binder polymer. An improved catalyst for use in the electrochemical reduction of oxygen comprising a perovskite-type compound having alpha and beta sites, and having a greater molar ratio of cations at the beta site. A particularly good reduction catalyst is a neodymium calcium manganite. An improved method of dispersing the catalysts with carbon in a reaction layer of the electrode improves performance of the electrode and the oxygen reduction process. This is provided by adding carbon black to an aqueous solution of metal salts before it is heated to a gel and then to a char and then calcined. Optionally, a quantity of the desired oxide catalyst can be premixed with a portion the carbon before adding the carbon to an aqueous solution of the metal salts to be heated. The amount of premixed metal oxide is chosen in conjunction with the amount of metal salts to provide the desired molar ratio after heating and calcining of the aqueous solution.

24 Claims, 6 Drawing Sheets

OTHER PUBLICATIONS

T. Hyodo et al., entitled Oxygen Reduction Activities of Praseodymium Manganites in Alkaline Solution, J. Cer. Soc. Jpn., vol. 105, pp. 412-417 (1997).

M. Hayashi et al., entitled Electrochemical Oxygen Reduction Properties of Perovskite-type OxidesLa1-xAxMn03 (A=Na, K, Rb) in Concentrated Alkaline Solution, Electrochemistry, vol. 68, pp. 112-118 (2000).

N. Yamazoe et al., entitled Mn-Based Perovskite-Type Oxides as Oxygen Reduction Electrode Catalysts for Metal-Air Batteries, Battery Technology, vol. 12, pp. 159-167 (2000).

T. Kudo et al., entitled Rare Earth Cobaltites as Oxygen Electrode Materials for Alkaline Solution, J. Electrochem. Soc., Mar. 1977, pp. 321-325.

\* cited by examiner

GAS DIFFUSION ELECTRODE AND CATALYST FOR ELECTROCHEMICAL OXYGEN REDUCTION AND METHOD OF DISPERSING THE CATALYST

BACKGROUND OF INVENTION

1. Field of the Invention

The present invention relates to gas diffusion electrodes, catalysts, and electrolytic cells suitable for chlor-alkali electrolysis, metal-air batteries, fuel cells and the devices concerned with electrochemical oxygen reduction, such as oxygen sensors.

2. Background of the Invention

Gas diffusion electrodes are used as oxygen cathodes suitable for chlor-alkali electrolysis, metal-air batteries, and fuel cells.

A gas diffusion electrode has a multilayer structure composed of a gas diffusion layer, a reaction layer, and a current collector for electrical connection. Gas phase oxygen is exposed to the gas diffusion layer. The reaction layer resides between the gas diffusion layer and an electrolyte.

After passing through the gas diffusion layer, oxygen is consumed through a reduction reaction on an oxygen reduction catalyst in the reaction layer. The reaction proceeds according to the following equation:

$$O_2 + 2H_2O + 4e^- = 4OH^-$$

The gas diffusion layer is required to allow the oxygen to pass therethrough rapidly and to diffuse uniformly into the entire reaction layer. The gas diffusion layer is also required to prevent the electrolyte from permeating to the gas phase. The gas diffusion layer is comprised of a material formed of carbon particles bonded to each other with a material, such as polytetrafluoroethylene, having high water repellent properties. The gas diffusion layer must also conduct electrons from the current collector to the reaction layer.

The reaction layer contains uniformly dispersed oxygen reduction catalyst particles in electronic continuity with the gas diffusion layer and current collector. In the reaction layer, a large interface area is formed among the oxygen, electrolyte, electrons, and the oxygen reduction catalyst.

The particles for forming the reaction layer can be prepared, for example, by mixing carbon particles, inter-mixed with an electrode catalyst with a dispersion of a fluorinated resin such as polytetrafluoroethylene, dispersing the mixture thus formed using a dispersing agent such as an alcohol, filtrating and drying the dispersion thus formed, and pulverizing the dried material into fine particles. Methods for processing the gas diffusion electrode layers are disclosed by Furuya in U.S. Pat. No. 6,630,081 and 6,428,722.

The current collector may be, for example, a wire mesh or a foam material, which is composed of nickel, silver, or the like.

Mainly noble metals such as platinum and silver, either dispersed in or supported on carbon black in the reaction layer, have been used and investigated as oxygen reduction catalysts for concentrated alkaline solution.

In the chlor-alkali application, utilization of an oxygen consuming cathode instead of a hydrogen evolving cathode provides the opportunity of reducing the specific power requirement since the theoretical operating voltage is lower by approximately 1.23V.

However, the over-voltage of electrochemical oxygen reduction gas diffusion cathodes using previous catalysts is high or increases over time. In the case of industrial chlor-alkali electrolysis, if the over voltage is too high, economical advantages of electrolyzers using gas diffusion cathodes are not realized compared to conventional electrolyzers using hydrogen cathodes. Accordingly, a stable catalyst with high catalytic activity for electrochemical oxygen reduction is needed to lower the over-voltage. Such a catalyst may also provide benefits for oxygen cathodes used in non chlor-alkali applications.

T. Hyodo et al. has shown $Pr_{0.6}Ca_{0.4}CoO_3$ perovskites to outperform Pt as an oxygen reduction catalyst in alkaline electrolyte, at least for 200 hours where air is the oxidant. Similarly, M. Hayashi et al. have shown $La_{0.8}Rb_{0.2}MnO_3$ to outperform Pt for 100 hours. Kudo et al. reported that a $Nd_{0.8}Sr_{0.2}Co_{1-y}Ni_yO_3$ catalyst electrode was stable over 300 hours with a potential $>-50$ mV relative to a Hg/HgO reference electrode at a presumably low current density and for $Nd_{0.8}Sr_{0.2}CoO_3$ at 100 mA/cm$^2$ the potential was 150 mV, and 250 mV for $Nd_{0.8}Ca_{0.4}CoO_3$. G. Karlsson demonstrated 200 mV at 150 mA/cm$^2$ with $Nd_{0.2}Ca_{0.8}MnO_3$. Yuasa et al. reported approximately 60 and 65 mV relative to a Hg/HgO reference electrode at 400 mA/cm$^2$ current density for a very short test of 3 hours in duration for $La_{0.8}Sr_{0.2}MnO_3$ and $La_{0.8}Sr_{0.2}Mn_{0.8}Fe_{0.2}O_3$. T. Hyodo et al. also claimed Fe in the perovskite composition aided stability when running $La_{0.5}Sr_{0.5}FeO_3$ approximately 225 mV relative to Hg/HgO reference electrode at 325 mA/cm$^2$ current density for 90 hours.

Thus many perovskite-type oxides have been shown to have high catalytic activity, where the over-voltage of gas diffusion electrodes using these catalysts was lower than that of gas diffusion electrodes using platinum or silver. However, neither the stability of perovskite-type oxides in a concentrated alkaline solution nor the long-range durability of gas diffusion electrodes using perovskite-type oxides have previously been confirmed, especially at high current density.

SUMMARY OF INVENTION

An objective of the present invention is to provide an electrocatalyst material to be used in an oxygen gas diffusion cathode, able to provide over-voltage lower than precious metals at high current density and for a long duration in an alkaline electrolyte.

Another objective is to provide a method for dispersing the electrocatalyst with the carbon black used in the gas diffusion reaction layer.

According to one aspect of the invention a catalyst for use in the reduction of oxygen comprises a perovskite-type compound having alpha and beta sites, and having a greater molar ratio of cations at a beta site of the compound.

According to another aspect of the invention a preferred catalyst has the formula $A_{1-x}A'_x(B_{1-y}B'_y)_zO_{3+\delta}$ where x, y and z are mole fractions and z has a value greater than one.

According to another aspect of the invention a catalyst according to the above formula is made where x has a value in the range of $0.01 < X < 0.9$; y has a value in the range of $0 \leq Y < 0.9$; $\delta$ has a value in the range of $-0.3 < \delta < 0.3$; and A is a metal selected from the group consisting of La, Pr and Nd; A' is one or more metals selected from the group consisting of K, Rb, Cs, Ca, Sr, and Ba; these metals are said to be on the "A site" or "alpha site"; B is a metal selected from the group consisting of Mn, and Co; and, B' is one or more metals selected from the group consisting of Fe, and Ni; these metals are said to be on the "B site" or "beta site".

According to another aspect of the invention, $Nd_{1-x}Ca_x(Mn_{1-y}Fe_y)_zO_{3+\delta}$ is proposed as a material particularly stable and active as a catalyst for the gas diffusion electrode. In a preferred embodiment, x has a value in the range of $0.1 \leq X \leq 0.6$, y has a value in the range of $0 \leq Y \leq 0.4$; $\delta$ has a value in the range of $-0.3 < \delta < 0.3$; and z has a value in the range of about 0.95 to about 1.05.

According to another aspect of the invention a perovskite catalyst may be formed such that cations at the beta site have a smaller crystal ionic radius than the cations at the alpha site.

According to one aspect of the invention, a method is provided which particularly suited for obtaining excellent dispersion of the catalyst in an electrode with the carbon used in electrode fabrication. In this method a portion or none of the desired oxide is premixed with the carbon black to ultimately be used for electrode fabrication, and then the balance of the desired oxide is prepared by adding an aqueous solution containing metal salts at a predetermined molar ratio along with a dispersant. The slurry is dried then calcined in a non-oxidizing environment.

Other aspects and advantages of the invention will be understood by those of skill in the art by further reference to the following Figures, description of exemplary embodiments, and claims.

DETAILED DESCRIPTION

Figure 1:
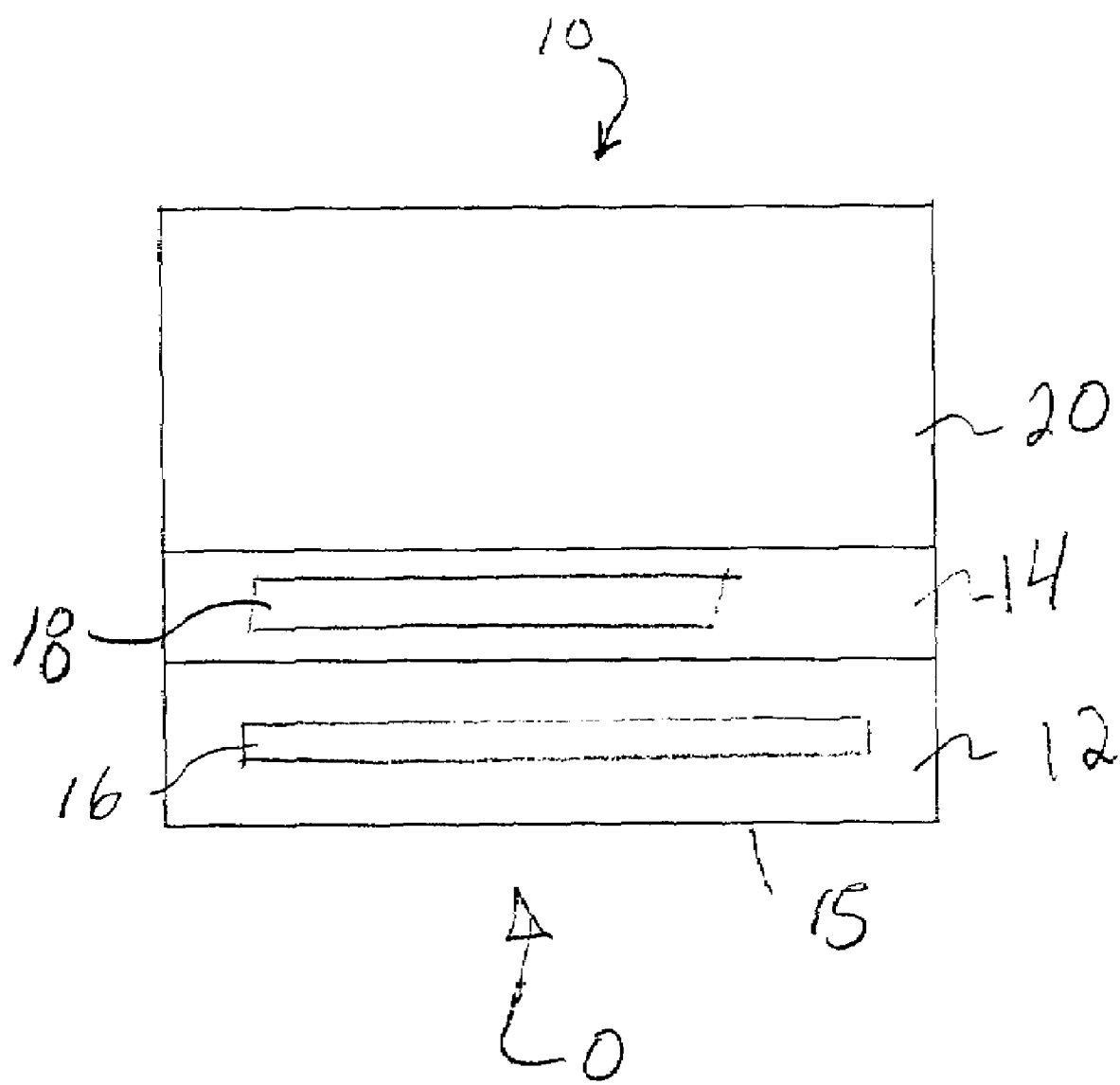
FIG. 1 is a schematic cross-sectional view of a gas diffusion electrode according to the invention.

The following is a description of preferred embodiments of the inventions. The drawings, the examples, and discussion relative to the embodiments are for exemplifying and illustrating aspects of the invention and are not intended to limit the claims to any embodiment disclosed.

Catalyst

A catalyst according to the invention that is particularly useful for a gas diffusion electrode is a stable and highly active perovskite oxide represented by the formula $A_{1-x}A'_x(B_{1-y}B'_y)_zO_{3+\delta}$ wherein A is a metal selected from the group consisting of La, Pr and Nd; A' is one or more metals selected from the group consisting of K, Rb, Cs, Ca, Sr, and Ba; B is a metal selected from the group consisting of Mn, and Co; B' is one or more metals selected from the group consisting of Fe, and Ni; X has a value in the range of $0.01 < X < 0.9$; Y has a value in the range of $0 \leq Y < 0.9$; $\delta$ has a value in the range of $-0.3 < \delta < 0.3$; and, where z has a value in the range $0.95 < z < 1.05$.

Whether a cation is an A or A' versus a B or B' cation is determined largely by its crystal ionic radius where substantially, cations in the range 1.0-1.7 Å are stable on the "A" site and cations in the range 0.59-0.80 Å are stable on the "B" site. In a nominal perovskite composition, $Z=1$ where the "A" site cations are about equal to the "B" site cations, but it is possible to vary the perovskite properties somewhat by varying Z. If $Z<1.0$ then the composition is "A" site rich. If $Z>1.0$ then the composition is "B" site rich.

According to another aspect of the invention, all the perovskite-type catalysts are more suitable for an oxygen reduction catalyst when synthesized to be "B" site rich; that is when $Z>1$.

$La_{1-x}Rb_x(Mn_{1-y}Fe_y)_zO3+\delta$, $La_{1-x}Cs_x(Mn_{1-y}Fe_y)_zO_{3+\delta}$, $Pr_{1-x}Sr_x(Mn_{1-y}Fe_y)_zO3+\delta$, $Pr_{1-x}Ca_x(Mn_{1-y}Fe_y)_zO_{3+\delta}$, $Nd_{1-x}Ca(Mn_{1-y}Fe_y)_zO_{3+\delta}$, $Nd_{1-x}Sr_x(Mn_{1-y}Fe_y)_zO_{3+\delta}$, are examples of perovskite materials applicable to this invention. Most notable are $La_{1-x}Rb_x(Mn_{1-y}Fe_y)_zO_{3+\delta}$ where $0.15<x<0.25$, $0<y<0.2$, $1<z<1.02$; $La_{1-x}Cs_x(Mn_{1-y}Fe_y)_zO_{3+\delta}$ where $0.1<x<0.3$, $0<y<0.2$, $1<z<1.02$; $Pr_{1-x}Sr_x(Mn_{1-y}Fe_y)_zO_{3+\delta}$, where $0.3<x<0.5$, $0<y<0.2$, $1<z<1.02$; $Nd_{1-x}Ca_x(Mn_{1-y}Fe_y)_zO_{3+\delta}$, where $0.3<x<0.5$, $0<y<0.2$, $1<z<1.02$; and $Nd_{1-x}Sr_x(Mn_{1-y}Fe_y)_zO_{3+\delta}$, where $0.3<x<0.5$, $0<y<0.2$, $1<z<1.02$.

Of these compositions, the most catalytic and stable is $Nd_{1-x}Ca_x(Mn_{1-y}Fe_y)_zO_{3+\delta}$, where $0.3<x<0.5$, $0<y<0.2$, $1<z<1.02$. X-ray diffraction patterns showed no decomposition of high surface area powder of this composition when exposed to 33% NaOH at 90 C for 1000 hours and cathodes were prepared which exhibited very low over potential when operated at relatively high current density at 90 C in 33% NaOH.

The carbon black used preferably with the present invention is in the form of fine particles, and for example, carbon black having a BET specific surface area of 30 to 2,000 $m^2/g$. That is, materials called acetylene black, furnace black, channel black, thermal black, and the like may be used. Those mentioned above may be used alone, or at least two materials among those mentioned above, which have different properties, such as particle diameters and hydrophilic properties, from each other, may be effectively used in combination whenever necessary. For the gas diffusion layer, carbon particles having high water repellent properties are preferably used. The particle diameter of the carbon black is preferably in the range of from 0.01 to 0.1 μm.

Method of Making Catalyst

Any method may be used to prepare the catalyst as long as a desired oxide can be obtained. Two exemplary and suitable methods will be disclosed below. In summary, a first method comprises mixing metal oxides together so as to obtain a mixture having a predetermined molar ratio followed by calcining. A second method comprises the steps of: preparing an aqueous solution containing metal salts at a predetermined molar ratio with one or more chelating agents such as ethylene glycol and citric acid; heating to gel the solution then to form a char; followed by calcining.

However, a third method, according to one aspect of the invention will be disclosed which is particularly suited for obtaining excellent dispersion of the catalyst with the carbon used in electrode fabrication. In this method a portion or none of the desired oxide is premixed with the carbon black to ultimately be used for electrode fabrication. The balance of the desired oxide is prepared by adding an aqueous solution containing metal salts at a predetermined molar ratio along with a dispersant. The slurry is dried then calcined in a non-oxidizing environment.

First Method of Preparing Catalyst

In the first method powdered metal oxides or powdered metal carbonates are mixed together so as to form an oxide mixture having a desired composition. Any mixing method may be used as long as the powdered metal oxides or the powdered metal carbonates are sufficiently mixed together. However, the mixing is preferably performed while the powdered materials are pulverized and de-agglomerated using a mortar and pestle or a mill. The resultant mixture thus formed is calcined by heating, thereby forming the oxide. The oxide may be analyzed by X-ray diffraction to verify that the desired perovskite structure has been obtained. Following calcining, the oxide may be milled to decrease particle size and thereby increase the specific surface area.

Second Method of Preparing Catalyst

In the second method an aqueous solution is prepared containing metal salts at a predetermined molar ratio with one or more chelating agents such as ethylene glycol and citric acid. This solution is heated to gel the solution then to form a char; followed by calcining. The metal salts, can be for example, a chloride, a nitrate, a sulfate, a carbonate, or an acetate. Again, the oxide may be analyzed by X-ray diffraction to verify that the desired perovskite structure has been obtained. Typically the oxide is attained at lower temperature in this method, compared to the first method described above. Following calcining, the oxide may be milled to decrease particle size and thereby increase the specific surface area. However, since the desired oxide can be obtained at a lower calcining temperature, less milling is typically required to attain comparable surface area. Accordingly, this method is a preferable method for preparing a catalyst since fewer impurities are introduced during milling.

Third Method of Preparing Catalyst

In this method, some or all of the perovskite oxide catalyst is prepared in the presence of the high surface area carbon black used in the reaction layer. A portion or none of the desired oxide is premixed with the carbon black to ultimately be used for electrode fabrication, then the balance of the desired oxide is prepared similar to the second method described above, with the exception that the fine carbon is added to the aqueous metal salt solution and the material is heated in a non-oxidizing atmosphere such as nitrogen or carbon dioxide to prevent oxidation of the carbon. With this method the perovskite oxide catalyst is highly dispersed with the carbon and the electrode is very active.

Any heating condition for calcining, including a temperature and a holding time, may be used as long as a desired single phase oxide can be obtained. The optimum temperature is dependent on the actual material; however, the temperature is preferably in the range of from 500° C. to 1,400° C. and is more preferably in the range of from 600° C. to 1,200° C. When the heating for calcining is performed at a higher temperature, the particle diameter is increased, and hence the surface area is decreased. The holding time is preferably in the range of from 1 to 10 hours. When the heating for calcining is performed together with carbon, in order to prevent the carbon from being oxidized, the heating is preferably performed in a non-oxidizing atmosphere containing nitrogen, carbon dioxide or the like. However, when the desired oxide can be obtained at a low temperature so that the carbon may not be oxidized, the heating for calcining may be performed in air or in an atmosphere containing oxygen.

Construction of Electrode

In the present invention, in order to form the gas diffusion electrode by bonding the carbon black particles and the powdered oxide catalyst, a fluorinated resin is used as a binder. As the fluorinated resin, for example, polytetrafluoroethylene (PTFE), fluorinated ethylene propylene copolymer (FEP), tetrafluoroethylene perfluoroalkoxy vinyl ether copolymer (PFA), ethylene tetrafluoroethylene copolymer (ETFE), and polychlorotrifluoroethylene (PCTFE) may be used. As the binder, a powdered fluorinated resin may be used. However, in order to improve the dispersibility of the carbon and the oxide catalyst, a dispersion composed of fine fluorinated resin particles dispersed in water by a surfactant is preferably used.

FIG. 1, discloses a gas diffusion electrode 10 having a multilayer structure composed of a gas diffusion layer 12, a reaction layer 14, and a current collector 16. The current collector 16 is provided inside the electrode 10 for electrical connection. Oxygen (indicated by the arrow labeled "O") is supplied from the gas diffusion layer side 15. The reaction layer 14 is in contact with an electrolyte 20. After passing through the gas diffusion layer 12, the oxygen "O" is reduced on an oxygen reduction catalyst 18 as described above, which is fixed in the reaction layer 14.

The reaction layer 14 is preferably formed as follows. The powdered catalyst prepared by the methods described above, are dispersed in a solvent along with carbon as described above. A dispersion containing a fluorinated resin is added to the resultant solvent described above, thereby forming a new dispersion. As a dispersion method, any method may be used as long as the catalyst, the carbon, and the fine fluorinated resin particles can be highly uniformly dispersed. Preferably a method using ultrasonic wave is used. As the solvent, water is primarily used, but an alcohol such as ethyl alcohol and other organic solvent may also be used. In addition, in order to improve the dispersibility, of course, various surfactants may also be used.

When the dispersion thus obtained is filtrated, washed, and dried, a powder for the reaction layer is obtained. Any drying method may be used as long as the solvent can be removed. How well the powder is dried can affect how effectively it can be distributed evenly for electrode fabrication. The amount of the oxide catalyst with respect to that of the carbon black is preferably in the range of from 10 to 90 percent by weight. When the amount of the oxide catalyst is too small, the total reaction surface area of the catalyst is decreased, and as a result, a sufficient oxygen reduction activity may not be obtained, resulting in degradation of the properties of the gas diffusion electrode. On the other hand, when the amount of the catalyst is too large, the catalyst is liable to agglomerate, and as a result, the total reaction surface area is decreased, or the electric conductivity may be decreased in some cases, resulting in degradation of the properties of the gas diffusion electrode.

In addition, the amount of the fluorinated resin is preferably in the range of from 5 to 30 percent by weight with respect to the total amount of the carbon black and the oxide catalyst. When the amount of the fluorinated resin is too small, the bonding force is low, and as a result, the strength of the gas diffusion electrode is not satisfactory. On the other hand, when the amount of the fluorinated resin is too large, the reaction surface area of the catalyst is decreased, and, the electric conductivity is also decreased, resulting in significant degradation of the properties of the gas diffusion electrode.

A powder for the gas diffusion layer can be formed by the same method as that for the reaction layer except that the catalyst is not used.

The powder for the reaction layer and the powder for the gas diffusion electrode are placed in a mold together with the current collector, and molding is then performed by hot pressing, thereby forming the gas diffusion electrode. Alternatively, a large gas diffusion electrode may be formed by the steps of adding solvents to the respective powders described above to form pastes, forming films from the individual pastes mentioned above, laminating the above-mentioned films together with the current collector, and performing hot pressing. The current collector may be formed of any material as long as it has sufficient electric conductivity for electrical connection and is not dissolved nor corroded at a potential at which electrochemical oxygen reduction occurs. Various wire meshes and foam metals may be used. For example, a silver or nickel mesh of #30 to #150 or foam nickel plated with silver may be preferably used.

In hot pressing, in order to obtain superior strength and durability of the electrode and, to form pores therein for smoothly supplying oxygen to the catalyst, the molding condition for bonding the carbon and the electrode catalyst to each other with the fluorinated resin binder must be selected. The press temperature is preferably in the range of from 350 to 390° C. which is close to the melting point of a fluorinated resin, and the molding pressure is preferably in the range of from 30 to 150 kgf/cm$^2$.

The total thickness of the electrode can be formed in the range of from 0.5 to 1.2 mm, and the thickness of the reaction layer and the thickness of the gas diffusion layer are preferably 0.05 to 0.3 mm and 0.45 to 0.9 mm, respectively. As long as the strength, the durability, and the electrode performance are all satisfied, the thicknesses are preferably as small as possible.

After the gas diffusion electrode formed as described above is placed in a cell for evaluation of electrochemical characteristics, oxygen or air is supplied from the gas diffusion layer side so that electrochemical oxygen reduction occurs, and the electrode potential are measured at various current densities, to evaluate the electrode performance.

The following Examples will further illustrate the advantages, aspects, and enablement of the present invention.

EXAMPLE 1

Preparation of Oxide Catalyst

First, an aqueous solution of neodymium nitrate, an aqueous solution of calcium nitrate, an aqueous solution of manganese nitrate and an aqueous solution of iron nitrate were mixed together in the appropriate molar proportions to form a mixed aqueous nitrate solution for making $Nd_{0.6}Ca_{0.4}(Mn_{0.8}Fe_{0.2})_{1.01}O_{3+\delta}$. Ethylene glycol and citric acid were added as chelating agents. This mixed aqueous solution was then heated in a glass container until the solution boiled and eventually ignited in the presence of air. Following ignition and an additional rise in temperature to about 350 C the remaining oxide precursor self-dried. Following drying, the remaining contents where placed in a conditioned sagger and calcined in air at 800 C for 8 hours. After calcining, X-ray diffraction analysis indicated the material to have a single phase of the perovskite structure. After the calcining the material was ball milled for 24 hours to attain a surface area of 17.2 m$^2$/g according to BET analysis.

Stability Test of Catalyst Material

Figure 2:
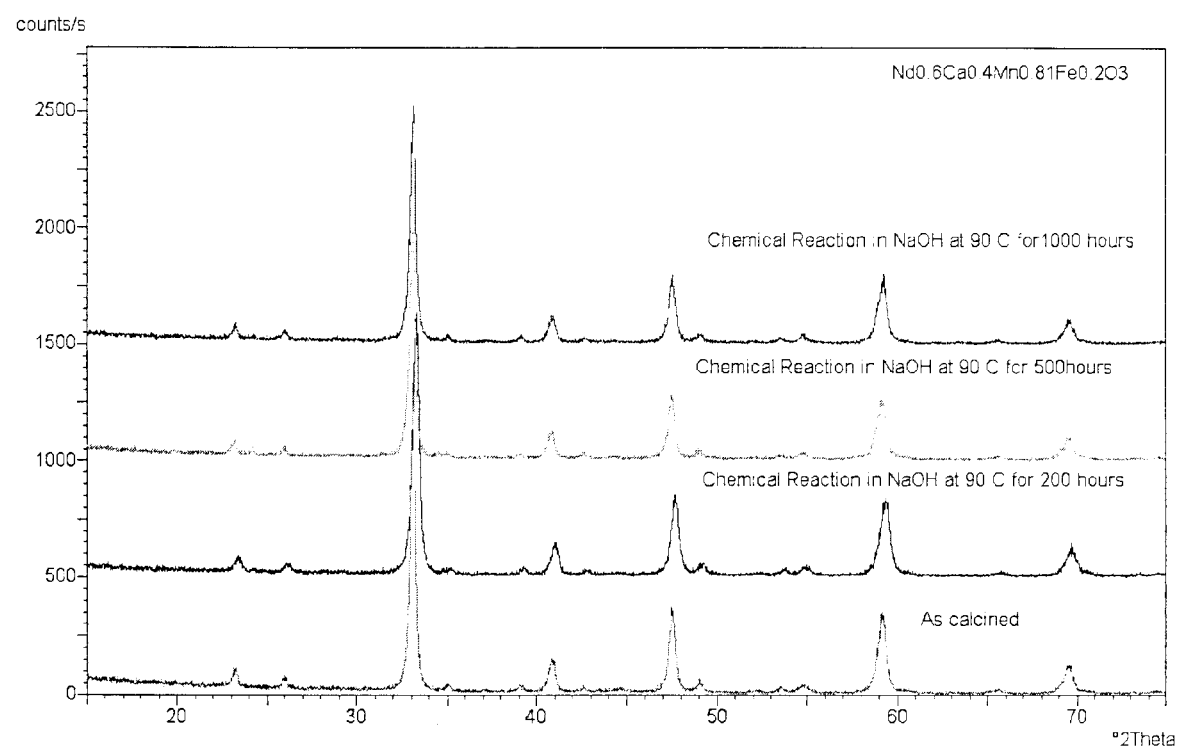
FIG. 2 is a graph showing the results of X-Ray diffraction of catalyst composition $Nd_{0.6}Ca_{0.4}(Mn_{0.8}Fe_{0.2})_{1.01}O_{3+\delta}$ immersed in an aqueous NaOH solution at a concentration of 33 percent by weight.

To evaluate the chemical stability of the oxide catalyst, high surface area samples were immersed in an aqueous solution of sodium hydroxide at a concentration of 33 percent by weight and at a temperature of 90° C. for 200, 500, and 1,000 hours. The XRD pattern of the oxide powder measured at each time mentioned above and that measured before immersion were observed. The results are shown in FIG. 2. Unlike most of the oxide catalyst candidates, $Nd_{0.6}Ca_{0.4}(Mn_{0.8}Fe_{0.2})_{1.01}O_{3+\delta}$, remained a single phase perovskite oxide, and did not decompose in part to a hydroxide of one or more of the material's constituents. The XRD pattern of the electrode, which was immersed in the aqueous solution of sodium hydroxide for 1,000 hours, was not substantially changed, and hence it was confirmed that the catalyst is stable even in an aqueous solution of sodium hydroxide at a high temperature.

Preparation of Powder for Reaction Layer

A reaction layer mixture containing the perovskite synthesized above was prepared by mixing 36 parts perovskite, 25 parts carbon black, for example KETJEN BLACK EC600JD (BET specific surface area of 1,270 m$^2$/g) from Lion Corporation, and 11 parts of a second carbon black, for example DENKA BLACK AB-7 from Denki Kagaku Kogyo K.K. Thus the catalyst to carbon ratio was 1:1. Then 10000 parts hot water (about 88 C) was added to the perovskite/carbon mixture and mixed with a high shear mixer for 2.5 minutes. Then 1000 parts ethanol was slowly added to the mixture during high shear mixing. These contents were transferred to a low energy mixer. In a separate vessel 24, parts of a polytetrafluoroethylene dispersion, for example POLYFLON TFE D-1 (solid component of 60 percent by weight) from Daikin Industries, Ltd., was mixed with 5000 parts hot water. That mixture was added to the contents already in the low energy mixer, and the resultant dispersion was then stirred. Next, 24000 parts of ethyl alcohol was slowly added to this resultant dispersion, followed by more low energy mixing then filtration through 1 μm pore size filter media. The filter cake was initially air dried at 40 C then subsequently dried at 150 C for 4 hours, then pulverized using a mill to form fine powder for the reaction layer.

Preparation of Powder for Gas Diffusion Layer 40 parts carbon black, for example DENKA BLACK AB-7 from Denki Kagaku Kogyo K. K., and 1600 parts hot water were mixed in a high shear mixer for 5 minutes. Next 28 parts polytetrafluoroethylene dispersion, for example POLYFLON TFE D-1 (solid component of 60 percent by weight) from Daikin Industries, Ltd., and 500 parts hot water were combined then added to the carbon/water mixture with low energy mixing for 5 minutes. Next 800 parts ethanol was slowly added while mixing with a low energy mixer.

Next the resultant suspension thus obtained was filtered through 1 μm pore size filter media. The filter cake was initially air dried at 40 C the subsequently dried at 150 C for 4 hours, then pulverized using a mill to form fine powder for the gas diffusion layer.

Formation of Gas Diffusion Electrode

After an aluminum foil degreased with acetone was placed at the bottom of a hot press mold having an inside diameter of 2.54 cm, 0.1 g of the powder for the reaction layer was evenly distributed in the die atop the foil, then 0.2 g of the gas diffusion layer powder was evenly distributed atop the reaction layer powder. The layers were pre-compressed with light pressure, then a nickel mesh of #100 having a wire diameter of 0.1 mm was placed on the pre-compressed powders. After the composite thus prepared was heated to 380° C., hot pressing was performed at 134 kgf/cm² for 1 minute, thereby obtaining the gas diffusion electrode.

Measurement of Polarization

Evaluation of electrochemical characteristics of electrochemical oxygen reduction was performed, in which the gas diffusion electrode was placed in a cell for evaluation of electrochemical characteristics and oxygen gas was supplied at a rate of about 50 standard ml/min from the gas diffusion layer side into an aqueous solution of sodium hydroxide at a concentration of 33 percent by weight and at a temperature of 90° C.

Figure 3:
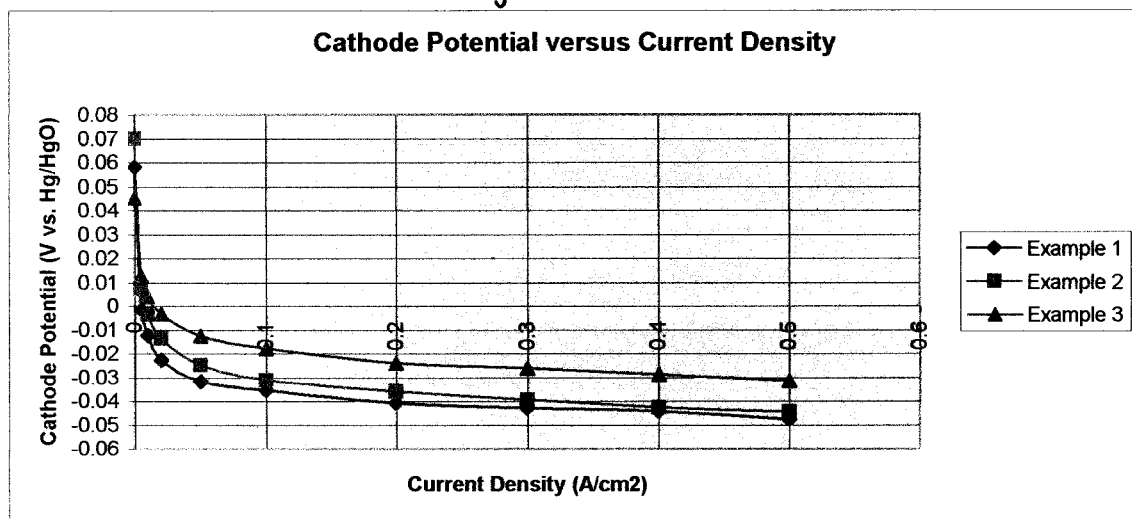
FIG. 3 is a graph showing cathode potential versus current density for gas diffusion electrodes made in accordance with the Examples disclosed herein.
Figure 4:
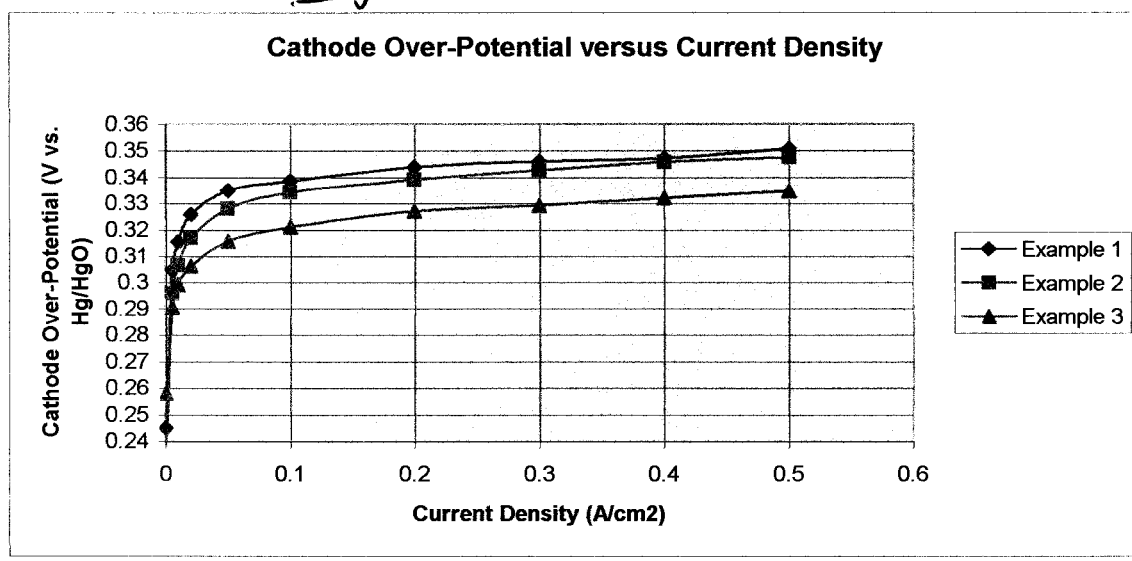
FIG. 4 is a graph showing cathode over-potential versus current density for gas diffusion electrodes made according to Examples disclosed herein.

In the cell for evaluation of electrochemical characteristics, flow path was provided each for oxygen supply and discharge, and the gas diffusion electrode was fixed to the cell using an o-ring, so that the inside of the cell was gas sealed. The cell thus prepared was fitted to an electrolytic bath, and the evaluation of electrochemical characteristics was performed. In this evaluation, the reaction layer side was only in contact with the aqueous solution of sodium hydroxide at a concentration of 33 percent by weight and at a temperature of 90° C., and oxygen was supplied from the gas diffusion layer side. The effective area of the gas diffusion electrode was 2.0 cm². As a DC stabilized power supply was used, a nickel mesh electrode was used as a counter electrode, and a mercury/mercury oxide electrode was used as a reference electrode. FIG. 3 shows the polarization curve of a cathode made with flowing oxygen made as described above. FIG. 4 is a plot of cathode over-potential versus current density assuming a standard potential of 0.401V for the reaction $O_2+2H_2O+4e^-=4OH^-$, and standard potential of 0.097V for the reference electrode ($HgO+H_2O+2e^-=Hg+2OH^-$). This data shown that this electrocatalyst is very active for oxygen reduction.

EXAMPLE 2

Figure 5:
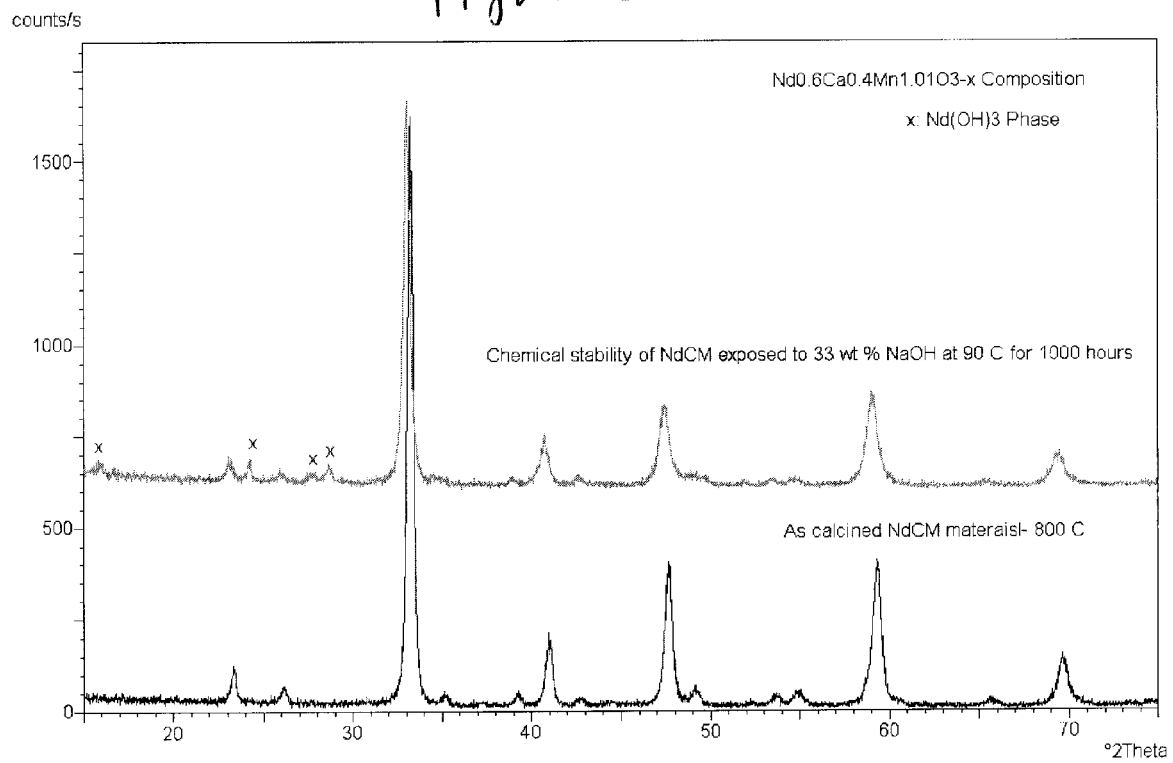
FIG. 5 shows diffractograms related to the gas diffusion electrodes made in accordance with the invention with counts per second on the vertical axis and 2 theta on the horizontal axis.
Figure 6:
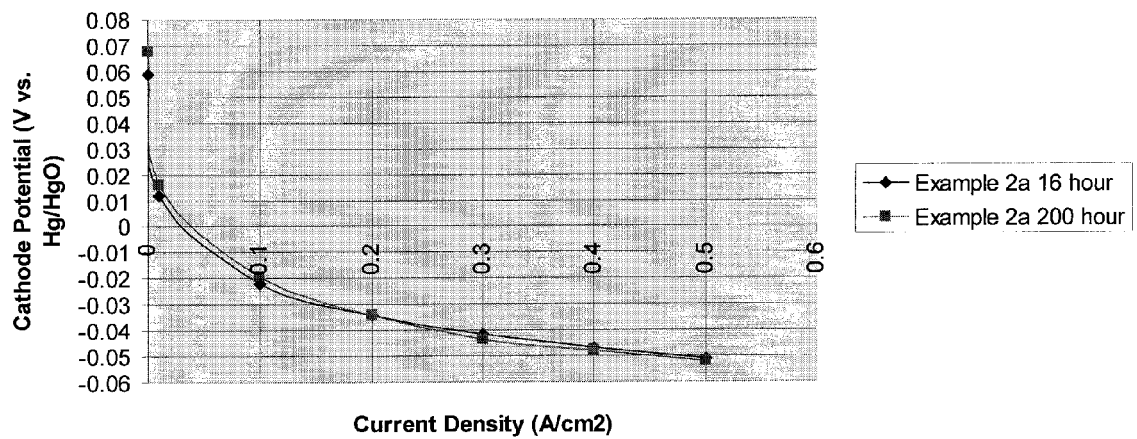
FIG. 6 is a graph showing cathode potential versus current density for gas diffusion electrodes made in accordance with the Examples disclosed herein.
Figure 7:
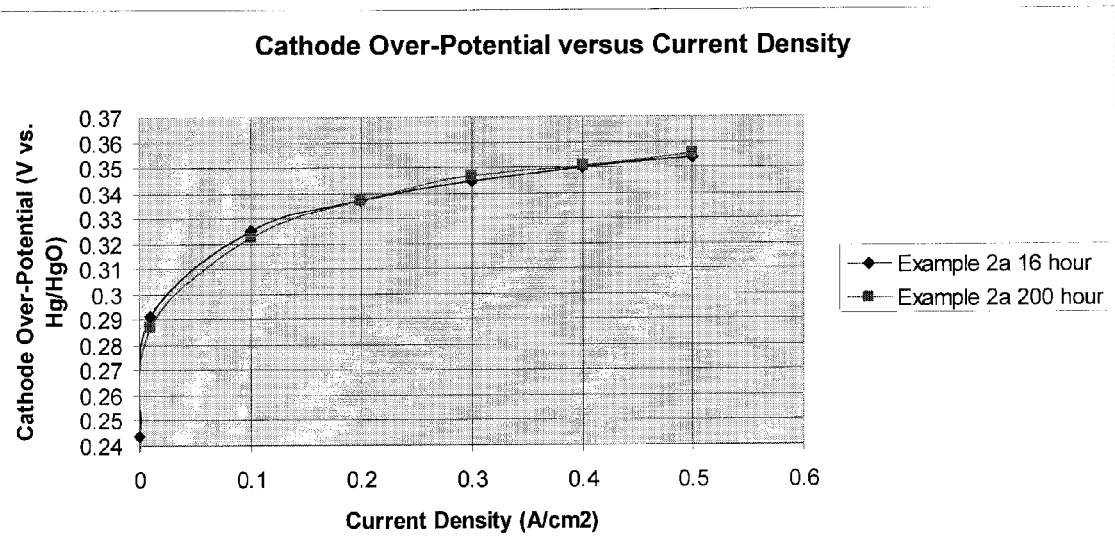
FIG. 7 is a graph showing cathode over-potential versus current density for gas diffusion electrodes made in accordance with Examples disclosed herein.

The gas diffusion electrode was formed in the same manner as that in Example 1 except that $Nd_{0.6}Ca_{0.4}Mn_{1.01}O_{3+\delta}$ was the catalyst oxide synthesized instead of $Nd_{0.6}Ca_{0.4}(Mn_{0.8}Fe_{0.2})_{1.01}O_{3+\delta}$. The chemical stability of the oxide catalyst was again evaluated where high surface area samples were immersed in an aqueous solution of sodium hydroxide at a concentration of 33 percent by weight and at a temperature of 90° C. for 1,000 hours. After 1000 hours time the XRD analysis indicated that only 0.16% of the material had reacted to form a hydroxide second phase based on comparison of the peak areas. FIG. 5 shows the diffractograms indicating the material to be very stable as in Example 1. Some of the material from this example was milled in an attrition mill for 16 hours to reach a specific surface area of 30.3 m²/g. Subsequently cathodes were made and tested electrochemically as in Example 1. FIG. 3 shows the polarization curves of cathodes with flowing oxygen. FIG. 4 is a plot of cathode over-potential versus current density for the cathodes. The polarization curve is very similar to that of the electrode prepared in Example 1. FIG. 6 shows the individual performance of a second electrode made according to Example 2. The polarization curve shows behavior after 16 hours and 200 hours of operation at 0.4 A/cm², 90 C, and 33% NaOH. Both curves are nearly the same showing that the electrode catalyst is very stable as well as active. FIG. 7 shows the same data expressed in terms of over-potential versus current density.

EXAMPLE 3

To further increase the activity of the catalyst a portion of the catalyst was made in the presence of the carbon to be used for the reaction layer. $Nd_{0.6}Ca_{0.4}Mn_{1.01}O_{3+\delta}$ prepared in example 2 was mixed with carbon black in the proportions of 8 parts perovskite, 7 parts carbon black, for example KETJEN BLACK EC600JD (BET specific surface area of 1,270 m²/g) from Lion Corporation and 3 parts of a second carbon black, for example DENKA BLACK AB-7 from Denki Kagaku Kogyo K. K. Thus the catalyst to carbon ratio was 4:5 at this point. Next 80 parts water was added and 0.3 parts oleic acid to serve as a dispersant.

Next, an aqueous solution of neodymium nitrate, an aqueous solution of calcium nitrate, an aqueous solution of manganese nitrate were mixed together in the appropriate molar proportions to form a mixed aqueous nitrate solution for making $Nd_{0.6}Ca_{0.4}Mn_{1.01}O_{3+\delta}$ of sufficient quantity such that the final ratio of perovskite oxide to carbon will be 1:1 after adding to the pre mixed perovskite and carbon. After low energy mixing, the material was dried at 80 C. After drying the material was calcined in a nitrogen gas environment at 700 C for 1 hour then cooled.

This material was made into a reaction layer material as described in Example 1 except no additional carbon was added. Next a gas diffusion electrode was made as described in Example 1 with this material. The cathodes were tested in a cell with a nickel mesh anode and Hg/HgO reference electrode, with 33% NaOH at 90 C. FIG. 3 shows the polarization curve of the cathode with flowing oxygen. FIG. 4 is a plot of the cathode over-potential versus current density. While the catalyst composition and ratio of catalyst to other constituents in this example are the same as example 2, cathodes made in this manner are much more active and as such have lower over potential.

Figure 8:
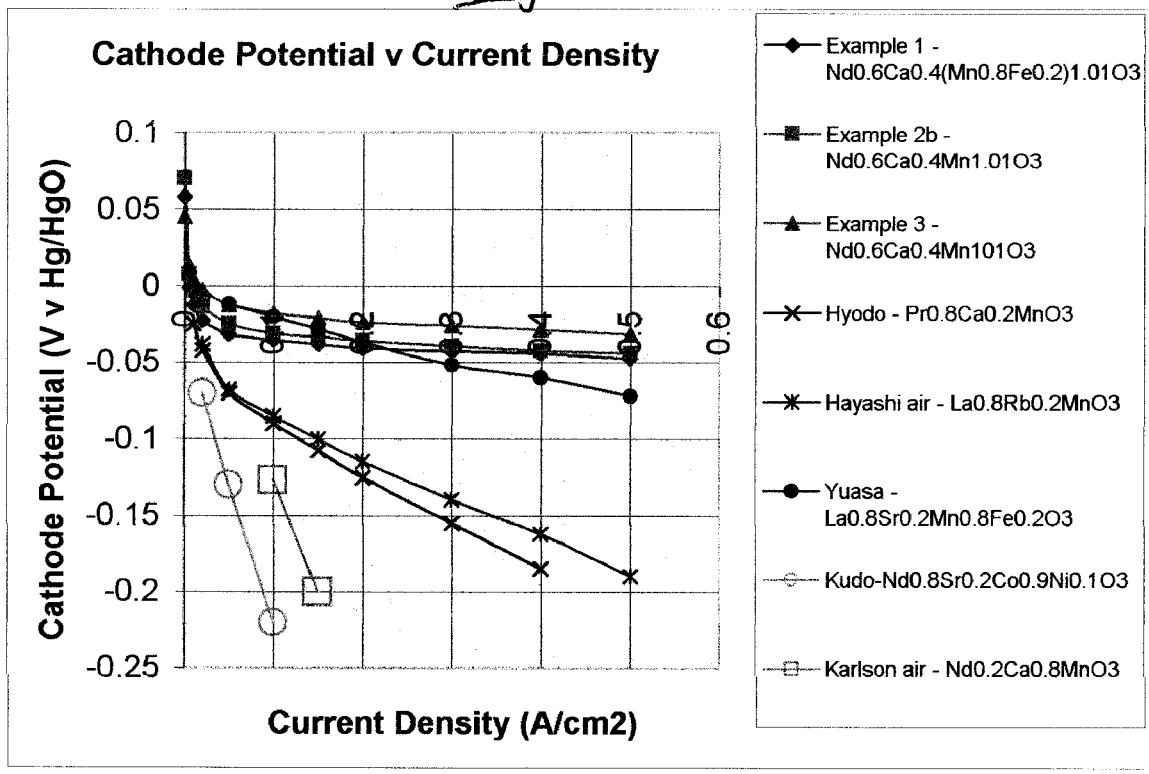
FIG. 8 is a graph showing a plot of the polarization curves of Examples 1, 2 and 3 disclosed herein, against data reported in literature for cathodes made from other materials.

FIG. 8 shows a plot of the polarization curves of Examples 1, 2, and 3 against data reported in the literature for cathodes made from other materials. All of the examples presently disclosed performed best at higher current densities.

EXAMPLE 4

Figure 9:
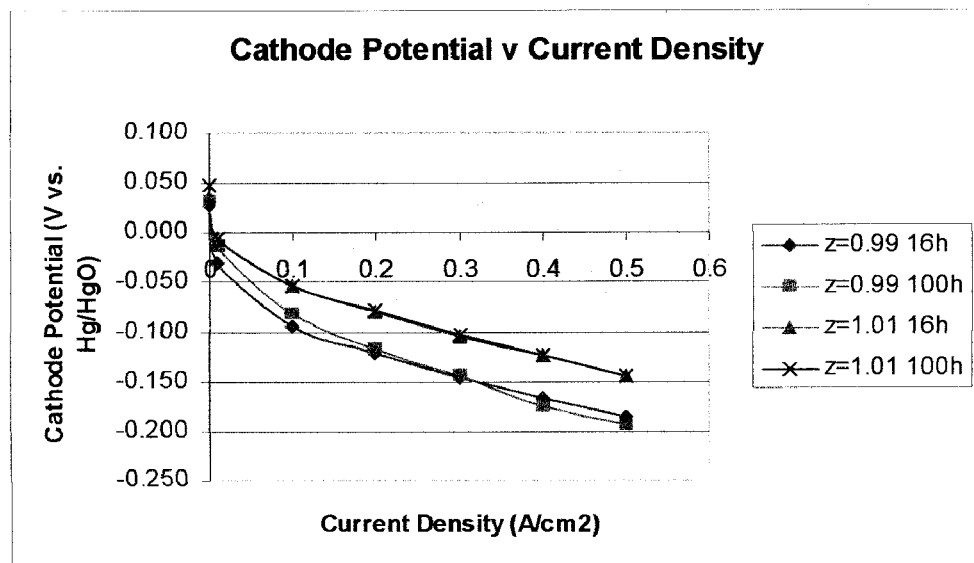
FIG. 9 is a graph showing polarization curves indicating the effects of compounds formulated to be beta site rich according to the Examples disclosed herein.

To determine the effect of whether a catalyst is "A" site rich or "B" site rich, two materials were made as in example 1, except one composition, $La_{0.8}Rb_{0.2}Mn_{0.99}O_{3+\delta}$, was A site rich while the other composition, $La_{0.8}Rb_{0.2}Mn_{1.01}O_{3+\delta}$, was B site rich. Gas diffusion electrodes with each material were made as described in Example 1 and they were tested under the same cell conditions as in Example 1. The respective polarization curves after 16 hour and 100 hour operation at 0.4 A/cm², 90 C and 33% NaOH of the 2 materials are shown in FIG. 9. The data shown in FIG. 9 shows that the "B" site rich composition had a more favorable polarization curve, with higher potentials than the "A" site rich composition. Also the XRD pattern of the respective electrodes after 100 hour operation showed less second phase formation in the "B" site rich composition compared to the "A" site rich composition.

COMPARATIVE EXAMPLE 1

Formation of Silver Supported Carbon

First, 1.0 g of carbon black, for example KETJEN BLACK EC600JD (BET specific surface area of 1,270 m²/g) from Lion Corporation, was added to 50 ml of an aqueous solution of silver nitrate at a concentration of 0.184 mol/l and was sufficiently stirred so as to have a uniform mixture. Subsequently, after the mixture thus obtained was dried by evaporation at 100° C. for 24 hours, heating was performed at 300° C. for 1 hour in a nitrogen atmosphere, and as a result, silver-supported carbon at a ratio of silver to carbon of 1 to 1 on a weight basis was formed.

Preparation of Powder for Reaction Layer

Next, 0.3 g of the silver-supported carbon thus formed was dispersed in 30 ml of water, and this mixture was then added to 0.1 g of a polytetrafluoroethylene dispersion POLYFLON TFE D-1 (solid component of 60 percent by weight) from Daikin Industries, Ltd., followed by sufficient stirring. Next, after 50 g of ethyl alcohol was added to this mixture and was then stirred, filtration was performed, and the solid component thus obtained was then dried at 100° C. for 24 hours. Subsequently, the resultant solid product was pulverized using a mill into fine particles, thereby obtaining the powder for reaction layer. Next, the powder thus obtained was washed with ethyl alcohol and water.

Hereinafter, the gas diffusion electrodes were formed in the same manner as that in Example 1 except that the powder for reaction layer containing silver described above was used. Furthermore, in the same manner as that in Example 1, the evaluation of electrochemical characteristics was performed.

The results of the evaluation of electrochemical characteristics confirmed that the electrode using $Nd_{0.6}Ca_{0.4}(Mn_{0.8}Fe_{0.2})_{1.01}O_{3+\delta}$ or $Nd_{0.6}Ca_{0.4}Mn_{1.01}O_{3+\delta}$ as a catalyst has a potential higher than that of the electrode using silver at a current density of 0.4 A/cm$^2$ and has superior characteristics.

The invention claimed is:

1. A catalyst for use in the electrochemical reduction of oxygen comprising:
a perovskite-type compound having alpha and beta sites and comprising the formula $A_{1-x}A'_x(B_{1-y}B'_y)_zO_{3-\delta}$ where x, y, and z are mole fractions and z is greater than 1.0 and wherein A is a metal selected from the group consisting of La, Pr and Nd, A' is one or more metals selected from the group consisting essentially of K, Rb, Cs, Ca, Sr, and Ba, and wherein B is a metal selected from the group consisting essentially of Mn and Co, and B' is one or more metals selected from the group consisting essentially of Fe and Ni.

2. The catalyst of claim 1 having the formula $A_{1-x}A'_x(B_{1-y}B'_y)_{z\ 3+\delta}$ where x, y and z are mole fractions and z has a range of about 1.0 to about 1.05.

3. The catalyst of claim 1 Wherein x has a value in the range of about 0.01 to about 0.9; y has a value in the range of about 0.0 to about 0.90; and δ has a value in the range of about −0.30 to about 0.30.

4. The catalyst of claim 1 wherein the cations at the beta site have a smaller crystal ionic radius than the cations at the alpha site.

5. The catalyst of claim 1 having a composition represented by the formula $Nd_{1-x}Ca_x(Mn_{1-y}Fe_y)_zO_{3+\delta}$.

6. The catalyst of claim 5 wherein x has a value in the range of about 0.01 to about 0.90; y has a value in the range of about 0.0 to about 0.90; and, δ has a value in the range of about −0.3 to about 0.30, and z has a range of about 1.0 to about 1.03.

7. The catalyst of claim 1, further comprising a greater molar ratio of cations at the beta site than the alpha site.

8. The catalyst of claim 1, wherein A and A' comprise the same metal.

9. The catalyst of claim 1, wherein B and B' comprise the same metal.

10. A catalyst for use in the electrochemical reduction of oxygen having a composition represented by the formula $Nd_{-x}Ca_x(Mn_{1-y}Fe_y)_zO_{3-\delta}$, wherein z is greater than 0.95, wherein x has a value in the range of about 0.01 to about 0.9; y has a value in the range of about 0.0 to about 0.9; δ has a value in the range of about −0.3 to about 0.3.

11. The catalyst of claim 10 wherein z has a range of about 0.95 to about 1.05.

12. The catalyst of claim 10 wherein x has a value in the range of about 0.1 to about 0.60; y has a value in the range of about 0.0 to about 0.40; and, δ has a value in the range of about −0.3 to about 0.30 and z has a value from about 0.95 to about 1.05.

13. The catalyst of claim 10 wherein z has a range of about 1.0 to about 1.02.

14. The catalyst of claim 10 wherein x has a value in the range of about 0.2 to about 0.50.

15. The catalyst of claim 10 wherein y has a value in the range of about 0.0 to about 0.30.

16. A catalyst for use in the electrochemical reduction of oxygen comprising a perovskite-type compound having alpha and beta sites, and wherein cations at the beta site have a smaller crystal ionic radius than cations at the alpha site.

17. The catalyst or claim 16, further comprising a greater molar ratio of cations at the beta site than at the alpha site.

18. A catalyst for use in the electrochemical reduction of oxygen comprising Nd, Ca, Mn, Fe, and O, said catalyst having a perovskite-type structure.

19. The catalyst of claim 18, wherein the catalyst comprises between about 2 and about 19.8 percent by mole of Nd.

20. The catalyst of claim 18, wherein the catalyst comprises between about 0.2 and about 18 percent by mole of Ca.

21. The catalyst of claim 18, wherein the catalyst comprises between about 2 and about 20 percent by mole of Mn.

22. The catalyst of claim 18, wherein the catalyst comprises between about 0 and about 18 percent by mole Fe.

23. The catalyst of claim 18, wherein the catalyst comprises between about 57 and about 62 percent by mole of O.

24. A catalyst for use in the electrochemical reduction of oxygen comprising;
between about 2 and about 19.8 percent by mole of Nd;
between about 0.2 and about 18 percent by mole of Ca;
between about 2 and about 20 percent by mole of Mn;
between about 0 and about 18 percent by mole of Fe; and
between about 57 and about 62 percent by mole of O; and
said catalyst having a perovskite-type structure.

* * * * *